United States Patent [19]

Bertolino

[11] Patent Number: 4,497,881
[45] Date of Patent: Feb. 5, 1985

[54] BATTERY CHARGE INDICATOR

[76] Inventor: Renee Z. Bertolino, 1648 Spruce St., S. Pasadena, Calif. 91030

[21] Appl. No.: 462,264

[22] Filed: Jan. 31, 1983

[51] Int. Cl.³ .......................................... H01M 10/48
[52] U.S. Cl. ...................................................... 429/91
[58] Field of Search ..................................... 429/90-93

[56] References Cited

U.S. PATENT DOCUMENTS

| 1,497,388 | 6/1924 | Sterling | 429/91 X |
| 2,980,754 | 4/1961 | Reilly et al. | 429/91 |
| 3,514,338 | 5/1970 | Shakour | 429/90 |
| 3,563,806 | 2/1971 | Hruden | 429/91 |
| 3,773,563 | 11/1973 | Eaton, Jr. et al. | 429/91 |
| 3,992,228 | 11/1976 | Depoix | 429/90 |
| 4,048,388 | 9/1977 | Chevet | 429/91 |
| 4,076,906 | 2/1978 | Jensen | 429/90 |

Primary Examiner—Anthony Skapars
Attorney, Agent, or Firm—Nilsson, Robbins, Dalgarn, Berliner, Carson & Wurst

[57] ABSTRACT

An electrical storage cell includes a charge producing compound in the interior of the cell which inherently and without the addition of additives or structure changes color as the charge of the battery is dissipated. The battery includes a window in either the top or the side of the battery to provide visual access to the charge producing compound. A suitable color chart is positioned around the window through the battery housing to enable an observer to see the charge producing compound in the interior of the battery and to compare the color of that charge producing compound against a color on the comparison chart to determine the battery charge remaining in the battery.

12 Claims, 4 Drawing Figures

BATTERY CHARGE INDICATOR

BACKGROUND OF THE INVENTION

The present invention relates to electrical storage cells and in particular to electrical storage cells with a visual indicator showing the remaining life of the cell.

Electrical primary cells which include a means for visually indicating the state of charge of the cell are known. For example, in Sterling, U.S. Pat. No. 1,497,388 issued June 10, 1924, an indicator apparatus is disclosed which is positioned at a location so that the current in the cell passes through the indicator. The indicator is a chemical impregnated paper which changes color depending upon the strength of the current passing through the chemical impregnated paper. Wires or electrodes must therefore be attached to opposite sides of the impregnated paper to provide a current flow through that paper.

In Rilly, et al., U.S. Pat. No. 2,980,754 issued Apr. 19, 1961, a cell exhaustion indicator is disclosed consisting of a relatively thin layer of a material which changes appearance on contact with the cell electrolyte. The material is positioned between a consumable metal annotic cell container and a transparent wrapper for the cell. As the anode is consumed producing electricity, small holes are created which provide openings through which the electrolyte reaches and soaks through the insulating material to come into contact with an indicating layer. When the electrolyte makes contact with the indicating light area, a reaction takes place which leaves a white contrasting reaction product.

In Eekma, U.S. Pat. No. 3,514,338 issued May 26, 1970, an indicator is added to the casing of a battery with the indicator substance being color changeable in the presence of water. This indicating substance is viewable through a transparent casing portion of the cell.

In Hurden, U.S. Pat. No. 3,563,806, a battery capacity and acitivation indicating structure includes a piece of absorbent material impregnated with a ph sensitive dye. The material is dried and then positioned in openings in the battery can with a transparent window being provided so that the impregnated material can be viewed. As the charge of the battery is depleted, the ph of the charge producing compound changes thereby causing the impregnated material to change colors.

In Eaton, Jr., et al., U.S. Pat. No. 3,773,563 issued Nov. 20, 1973, a dye/aluminum mixture is placed in a cylindrical recess drilled in a zinc plate with the recess being sealed to cover the dye/aluminum mixture. As power is provided from the battery, the zinc electrode is dissolved until the end of the recess is eaten away and the dye liberated. The change in color of the electrolyte when the dye is released can be viewed to indicate that the life of the battery has been depleted.

In Depoix, U.S. Pat. No. 3,992,228, issued Nov. 16, 1976, the indicator consists of a perforated copper or copper alloy sheet which is made visible from the outside of the cell by a suitable transparent window through the side of the cell. When assembled, the copper sheet becomes coated with a film of zinc giving the copper sheet a gray color. During cell discharge, the zinc of this film oxidizes and the original coloration of the copper sheet becomes visible.

Finally, Shevet, U.S. Pat. No. 4,048,388 issued Sept. 13, 1977, discloses an indicator consisting of an enclosed substance in the interior of the cell which can be viewed from outside of the battery. This substance is such that it changes color when it comes in contact with the electrolyte. The electrolyte comes in contact with the indicating substance only after the container in which the indicating substance has been placed has been consumed by the charge generating chemical reaction. Hence, the indication will occur only after the charge in the battery has been substantially depleted.

In each of the above-described patents, the indicating means requires the addition of an indicating chemical which changes color when it comes into contact with the electrolyte or (Shevet, Hurdin, Rilly, et al., or Eekma) or includes a structure and chemical which changes color depending upon the electrical charge passing through the indicating structure (Sterling); or relies upon the alteration of the physical structure to release or expose an indicator structure (Eaton, Jr., et al. and Depoix). None of the above references recognize that the charge producing compound inside the battery itself, whether it be the anode, cathode or electrolyte changes colors as the charge in the battery depletes. By contrast, the present invention has eliminated the addition of separate chemical additives or structures which are acted upon by the electrolyte or charge producing compound and instead provides a battery structure with a window which views the charge producing compound untainted by any color changing chemical additives. By eliminating such indicating structures or chemicals, the present invention not only can be made less expensively, but will be able to provide a continuous indication of the remaining life of the battery.

SUMMARY OF THE INVENTION

In accordance with the invention, an electrical storage cell for generating electrical charge in response to chemical reactions includes housing having a side region and two end regions and a charge producing compound in the housing where the charge producing compound is free of charge indicating additives but itself changes color as the cell charge is depleted. A window is positioned in the housing whereby the color changing charge producing comPound can be viewed directly by the user. The remaining charge of the storage cell is indicated by the color of the charge producing compound.

The cell in accordance with the invention may further include a color comparison chart which is positioned on the housing whereby the color of the charge producing compound viewed through the window can be visually compared to the color on the chart to determine the charge remaining in the cell.

The window may consist of a transparent plug-like member which is positioned in an orifice through the housing to enable the visual observation of the charge producing compound. Alternatively, the entire housing may be covered with a transparent outer ply with an oPaque metal can portion of the housing provided as an interior ply with an orifice through the opaque interior ply. Additionally, the window in accordance with the invention may be positioned either in the side or in either end of a conventional cell. In accordance with the invention, it is preferred to use an alkaline type battery and to position the window in the end region of the cell for easier visual access to the charge producing compound.

BRIEF DESCRIPTION OF THE DRAWINGS

A complete understanding of the present invention and of the above and other features and advantages may be gained from a consideration of the following description of the preferred embodiments taken in conjunction with the accompanying drawing where.

DETAILED DESCRIPTION

Figure 1:
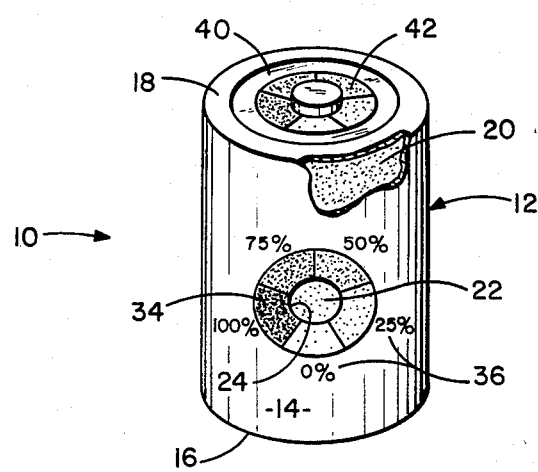
FIG. 1 is a perspective view of an electrical cell illustrating an indicator window in accordance with the invention in both a side region and a top region.

Referring to FIG. 1, a typical battery 10 in accordance with the invention includes a housing 12 which in the illustrated embodiment includes a cylindrical side region 14, a bottom end 16 and a disk-like top end 18. In the interior of the cell is any suitable structure well known in the art such as that described in Vanostrum Scientific Encyclopedia at page 264 and in various of the above cited patents. Each of these batteries is characterized by one or more charge producing compounds which react in such a way as to generate electricity. For simplicity, only the charge producing compound 20 is illustrated in FIG. 1. However, various structural features exist in the interior of the cell which are not illustrated.

The charge producing compound 20 may be the electrolyte, the anode gel, the cathode material or a combination of two or more of these compounds.

The charge producing compound 20 is such that it takes on a particular color, for example black, when the battery has a full charge and gradually changes color to taken on a second different color, for example grey, as when the battery charge is depleted. Such a color change occurs in the charge producing compound itself rather than being produced as in prior art batteries by the addition of color indicating compounds or structures. One such compound which was observed to have such a color change is the compound in alkaline batteries such as the alkaline battery sold under the trade name DURA-CELL or the alkaline batteries sold under the SEARS private lable.

The present invention takes advantage of this inherent color change characteristic in the charge producing compound to provide a means which in certain embodiments may add virtually no cost to the construction of the cell whereby the charge producing compound can be viewed through a window in the cell and compared with an adjacently positioned color chart to thereby indicate the amount of battery life remaining in the cell.

Figure 2:
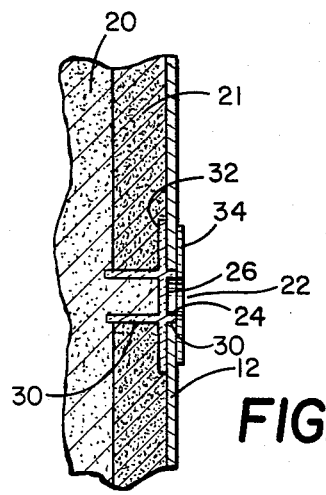
FIG. 2 is a partial cross-sectional view of the cell in accordance with the invention where the window consists of a transparent plug-like member.

Referring to FIG. 1 in conjunction with FIG. 2, a window 22 for viewing the charge producing compound 20 may be located in the side region 14 of the housing 12. In the embodiment shown in FIG. 2, the housing 12 is opaque and may for example be the metal can of the battery. An orifice 24 is then provided through the housing into the region where the charge producing compound 20 is located. This may require an orifice through one or more compound layers such as the compound layer 21.

Figure 3:
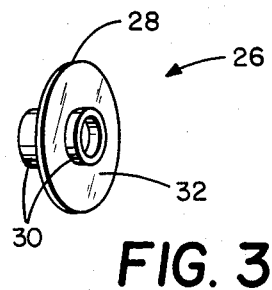
FIG. 3 is a front view of the transparent plug-like member illustrated in FIG. 2.

A transparent window structure 26 may then be inserted into the housing orifice 24 in such a way that leakage between the window 26 and the housing 24 will not occur. The transparent window 26 may for example be a circular disk-like member 28 as illustrated in FIG. 3 which slices through the end or a center region of a cylindrical wall portion 30. The cylindrical wall portion has an outside diameter approximately the same size as the inside diameter of the orifice 24 through the housing 12 so that the portion of the cylinder wall 30 directed outwardly from the battery will fit snuggly in the housing orifice 24 with the outer flange region 32 of the disk-like member 28 overlapping and being adjacent to a portion of the housing 12.

If the charge producing compound is at an interior region, then the cylindrical wall 30 may be extended inwardly from the disk-like member 32 to pass through the one or more layers 21 and into the region containing the charge producing compound. Alternatively, the inward extension of the cylindrical wall 20 may be eliminated with the charge producing compound 20 by simply extending into the orifice through the layer 21. It will be appreciated that reference to "disk-like" includes any flat planar shape whether circular, square, elliptical or any other shape. Also reference to "cylindrical" in reference to the window includes all cross-sectional shapes such as circular, triangular, and square.

A suitable comparison chart 34 may then be glued or otherwise affixed to a location adjacent the housing orifice 24. The comparison chart will preferrably contain a continuum of color shades which correspond to the different colors of the charge producing compound which occur as the charge in the battery is dissipated. Alternatively, the comparison charge may include a plurality of separate regions each having a slightly different color but each color corresponding to a color which the charge producing compound would assume at a particular stage in the life of the cell. Appropriate indicating markings 36 such as percent marking may be added to indicate the amount of charge remaining in the battery and hence the remaining battery life.

Figure 4:
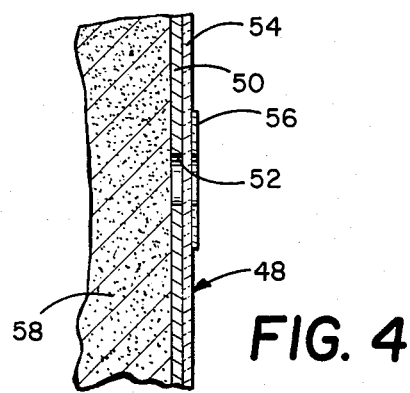
FIG. 4 is an alternative embodiment of a cell having the indicator in accordance with the invention where the transparent portion is provided by a transparent ply of the cell housing.

Referring again to FIG. 1, a window 40 may be additionally or alternatively positioned in either the top 18 or bottom 16 of the cell 10. A suitable comparison chart 42 may then be positioned either in the center of a donut shaped window 40 or around the periphery of a circular window such as that shown at 22. In all other respects, the window 40 in either the top or bottom of the batter 10 will be substantially like the window 22 in the side 14 of the housing 12 although access to the charge producing compound for purposes of observation may be more or less difficult in the one or the other location. Referring to FIG. 4, an alternative embodiment of the invention is illustrated where the housing 48 consists of a first or inner metal opaque ply 50 with an orifice 52 therethrough. A transparent housing ply 54 is then provided to cover the entire surface of at least the side of the opaque ply 50. The color comparison chart 56 may then positioned adjacent the housing orifice 52 or alternatively may be positioned between the transparent housing ply 54 and the opaque housing ply 50 adjacent to the housing orifice 52 so that a charge producing compound 58 in the interior of the cell can be viewed through the portion of the transparent housing ply 54 over the housing orifice 52.

Of course, various other configurations may be utilized in accordance with the invention so long as the charge producing compound is made observable through the window, the charge producing compound is such that it changes color as the charge is dissipated and that the charge producing compound is devoid of indicating chemicals or structure added to the charge producing compound or positioned adjacent to or in contact with the charge producing compound to provide the indication.

By providing the window in accordance with the invention and eliminating additives, the cost and complexity of providing an indication of battery life will be greatly decreased so that its incorporation will be practically feasible.

What is claimed is:

1. An improved electrical storage cell for generating electrical charge in response to a chemical reaction comprising:
   a housing having a side region and two end regions;
   a charge producing compound in the housing, the charge producing compound being free of charge indicating additives, but itself changing color as the cell charge is depleted;
   window means in the housing whereby the charge producing compound can be viewed by a user, the remaining charge of the storage cell being indicated by the color of the charge Producing compound.

2. The cell of claim 1 further comprising a color comparison chart positioned on the housing whereby the color of the charge producing compound can be visually compared to the color on the chart to determine the charge remaining in the cell.

3. The cell of claim 1 wherein the housing comprises:
   a transparent ply and
   an opaque ply, with an orifice therethrough, the window means comprising that portion of the transparent ply juxtaposed with the orifice through the opaque ply.

4. The cell of claim 2 wherein the housing comprises:
   a transparent ply and
   an opaque ply, with an orifice therethrough, the window means comprising that portion of the transparent ply juxtaposed with the orifice through the opaque ply.

5. The cell of claim 1 wherein the window means is positioned in one of the end regions of the housing.

6. The cell of claim 2 wherein the window means is positioned in one of the end portions of the housing.

7. The cell of claim 3 wherein the window means is positioned in one of the end portions of the housing.

8. The cell of claim 1 wherein the window means is positioned in the side region of the housing.

9. The cell of claim 2 wherein the window means is positioned in the side region of the housing.

10. The cell of claim 3 wherein the window means is positioned in the side region of the housing.

11. The cell of claim 1 wherein the housing has an orifice therethrough and the window means comrprises a transparent member having a disk-like portion and a tube-like portion extending perpendicularly to disk-like portion, at least part of the cylindrical portion being positioned in the housing orifice to enable visual observation of the charge producing compound.

12. The cell of claim 11 wherein the disk-like portion bifurcates the tube-like portion.

* * * * *